Feb. 20, 1968 J. A. TILLER 3,369,261

PLUMBING FIXTURE INSTALLATION

Filed Feb. 18, 1965

INVENTOR
James A. Tiller
BY
ATTORNEY

United States Patent Office 3,369,261
Patented Feb. 20, 1968

3,369,261
PLUMBING FIXTURE INSTALLATION
James A. Tiller, Louisville, Ky., assignor to American Standard Inc., a corporation of Delaware
Filed Feb. 18, 1965, Ser. No. 433,656
9 Claims. (Cl. 4—187)

ABSTRACT OF THE DISCLOSURE

A guard member which is adapted to be received about the peripheral lip portion of a sink or the like to prevent chipping of the lip during handling or transit of the sink. The member includes a sealing leg portion and a protective leg portion which is positioned over the enamel surface of the sink. Means are provided to facilitate separation of the protective leg portion from the sealing leg portion during installation of the sink to automatically provide a frameless seal between the sink and a supporting member.

---

This invention relates in general to a fixture and combination guard and gasket therefor, and to a method of handling and installing a fixture. More specifically the invention relates to a sink or the like provided with a combination guard and gasket member, and to a method of protecting such sink against damage during the handling and installation of the sink.

Fixtures, such as sinks and the like, formed of a cast iron base are generally coated with a smooth enamel or porcelain surface. Usually such sinks are provided with a peripheral flange terminating in a rim or lip for supporting the same on a counter top or the like when installed. As a result, the nature of the fixture is such that the peripheral edge portion thereof is vulnerable to chipping or damage during in-plant handling, or during subsequent shipping or installation thereof. Further, the installation of such sinks in a counter top generally required an extraneous sealing frame to provide a suitable seal therefor to prevent leakage into the cabinet generally disposed below such counter tops. Also, the use of puttys and mastics were frequently resorted to in order to insure a fluid tight seal. However, the use of metal framing to form such seal generally presented a relatively complicated and costly installation procedure. Use of puttys and mastics on the other hand are not satisfactory in that they tend to deteriorate in time, thereby requiring constant attention, repair or replacement during the life of the sink installation. Also, puttys and mastic seals and the deterioration thereof provide a generally unsightly and unsanitary appearance.

It is therefore an object of this invention to provide in combination with a sink or the like a peripheral protective combination guard and gasket forming member constructed and arranged to protect the vulnerable edges of the sink against damage during handling, and which member is arranged to form a seal between the sink and counter top upon installation thereof.

It is another object to provide a sink with a peripherally extending combination guard and gasket structure arranged to protect the vulnerable edge of a sink against damage during handling, and which defines upon the completion of a sink installation a frameless seal therefor.

Another object is to provide the peripheral edge or lip of a sink with a protective guard and seal that is relatively simple in construction, inexpensive to manufacture, and which is positive in operation.

Another object is to provide a protective guard for the vulnerable peripheral edges of a sink which can be readily applied thereto at the point of manufacture, whereby the sink can be subsequently installed with the guard in place thereon to form a seal and thereby simplify the installation procedures.

Another object is to provide a gasket construction capable of functioning both as a protective guard during the shipping and handling of the fixture to which it is attached, and a seal therefor in which a portion of the gasket is rendered readily movable upon the completion of the installation to define a frameless seal for the fixture.

Another object is to provide an improved method of handling and installing a sink in a counter top or the like to form a frameless seal between the sink and counter top.

The foregoing objects and other features and advantages are attained by a sink or the like having a combined guard and gasket forming member sized to circumscribe and embrace the peripheral edge portion or rim of a sink by which it is supported on a counter top. The combined guard and gasket forming member comprises essentially of an endless member constructed and arranged so as to snugly embrace the peripheral lip portion or rim of a sink. Accordingly, a member is formed substantially U-shaped in cross section to define a sealing leg portion and an integrally connected protective leg portion, the latter being arranged to extend over that portion of the porcelain or enamel surface of the sink that is generally vulnerable to chipping. The arrangement is such that the combined gasket and guard member, when applied to the peripheral edges of the sink, functions as a protective guard therefor during handling. On installation of the sink the sink is installed with the combined gasket and guard in place. Upon securing the sink in place on installation, the portion of the guard member overlying the enameled or procelain surface of the sink is removed to define a frameless seal for the sink. To facilitate removal of the protective leg of the guard, the guard or gasket member may be provided with a frangible portion formed at the junction between the sealing leg portion and the protective leg portion thereof. The arrangement is such that the frangible portion facilitates ready separation of the protective leg portion from the sealing leg portion upon the completion of the installation operation.

A feature of this invention resides in the provision of a combined endless gasket and guard structure constructed and arranged so as to protect the vulnerable edge portions of the sink during shipping and handling, and which upon installation of the sink is installed in place to define a frameless seal between the periphery of the sink and the counter top on which it is supported.

Another feature resides in the provision of a combination guard and gasket formed with means to effect stripping of the protective leg portion thereof from the sealing leg portion thereof upon completion of the installation procedures to define a frameless seal for the sink.

Other features and advantages will become more readily apparent when considered in view of the drawings in which:

FIGURE 1 is a fragmentary sectional view illustrating the vulnerable peripheral edge portion of a fixture construction as for example, a sink or the like.

Figure 1:
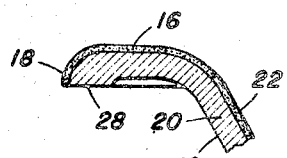

Referring to the drawings, there is shown a receptacle or fixture 10 as for example, a sink, tub or the like which is adapted to be installed in an opening 12 formed in a counter top 14 or the like adapted to support the same. Generally such fixtures 10 are provided with a laterally extending circumscribing portion 16 that terminates in a rolled edge or lip that defines the support therefor in a counter top 14. Such sinks, as shown in FIGURE 1, are usually formed of a cast iron base 20 covered with a porcelain or enamel surface 22. As a result, experience has shown that the peripheral edge portions 18 of such sinks, are vulnerable to chipping and damage during inplant handling, shipping or installation thereof.

Figure 3:
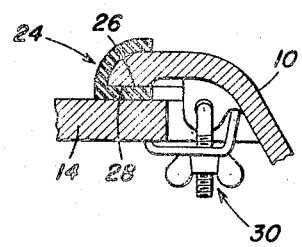
FIGURE 3 is a fragmentary sectional view shown in cross section of the combined guard and gasket illustrated in combination with the sink as installed in a counter top.
Figure 6:
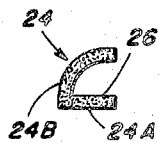
FIGURE 6 is a cross sectional view of the combined gasket and guard member taken along line 6—6 on FIG. 2.
Figure 2:
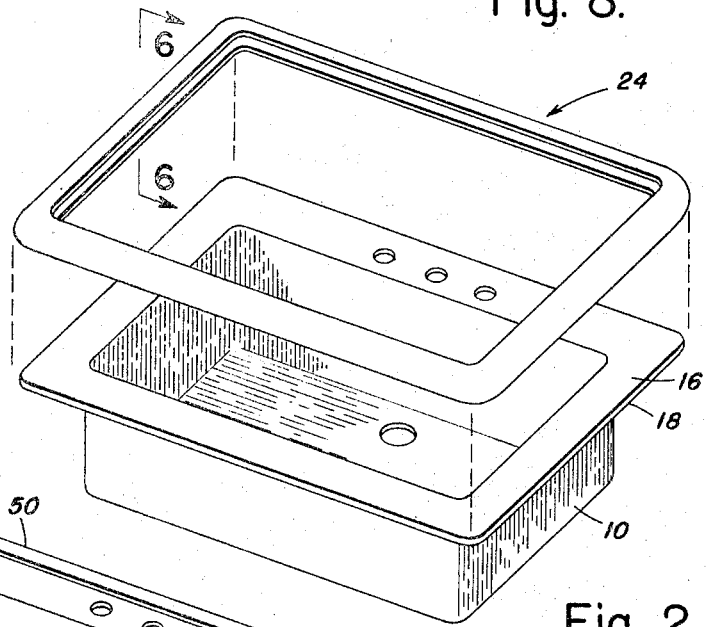
FIGURE 2 is an exploded perspective view of the improved combined gasket and guard member, and a fixture to which it is applied.

In accordance with this invention, to avoid such damage and to simplify the installation procedures there is provided a combined gasket and guard construction 24 which is particularly constructed to circumscribe the peripheral edge portion or lip 18 of the sink. As shown in FIGS. 2, 3 and 6, the combined gasket and guard construction 24 comprises an endless member having a substantially U-shaped cross section that is sized to snugly embrace the peripheral edge or rim 18 of the sink 10. In the form of the invention disclosed by FIGS. 1, 3 and 6, the combined guard and gasket member may be formed of a suitable resilient material as for example, rubber, vinyl, plastic or the like.

Essentially, the combined gasket and guard member includes a sealing leg portion 24A, the inner surface 26 of which is adapted to engage with the flat supporting surface 28 of the rim 18. The other portion 24B of the combined gasket and guard member 24 is adapted to embrace the porcelain or enamelled surface 16 of the rim 18 that constitutes the most vulnerable portion of the sink 10 to form a protective leg portion therefor. The arrangement of the combined gasket-guard member 24 is such that it will snugly embrace the peripheral edge 18 of the sink and is thereby retained in place thereon once fitted thereto. If desired a suitable adhesive bonding agent may be applied to the inside surface 26 of the sealing leg portion 24A so as to insure a positive bond between the under flat surface 28 of the rim 18 and the adjacent sealing leg portion 24A. Thus in shipment, with the combination gasket and guard 24 in place on the sink, it will be noted that the vulnerable edge 18 of the sink, otherwise subjected to possible chipping and damage during handling, is thoroughly protected thereby.

Figure 5:
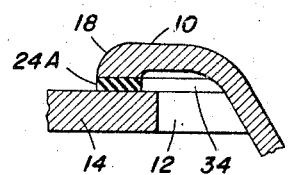
FIGURE 5 is a cross sectional view similar to that of FIGURE 4 showing the final frameless seal installation of the instant invention.
Figure 4:
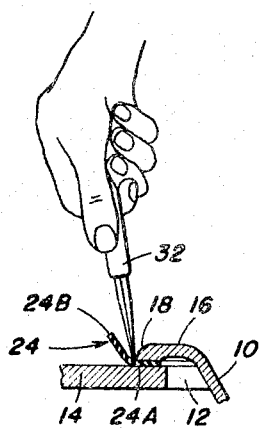
FIGURE 4 illustrates an intermediate installation procedure showing the removal of the protective leg portion of the combined gasket and guard member to form a frameless seal installation.

To enhance the installation of a sink 10 in a counter top 14, the sink 10 is installed with the combined gasket and guard member 24 in place thereon. This is readily attained by simply fitting the sink 10 in position within an opening 12 provided in a counter top and securely clamping the sink in place by a hook bolt and clamp assembly 30. With the sink 10 firmly secured in place to the counter top 14, the sealing leg portion 24A of the combined gasket and guard is firmly wedged between the counter top 14 and the rim 18 of the fixture or sink 10. At this point of installation, the protective leg portion 24B of the combined guard and gasket member 24 is peeled off the porcelain surface 16 of the sink 10 and stripped from the sealing leg portion 24A as by cutting the same with a suitable cutting tool or knife 32 as shown in FIGURE 4. Thus, in the finished installation of the sink, as viewed in FIG. 5, a frameless seal 34 is provided for the sink in that the entire seal is formed between the counter top and the flat surface of the rim. In this manner a frameless seal is permanently provided with a relatively simple installation procedure that can be expediently performed.

Figure 7:
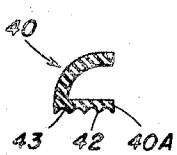
FIGURE 7 is a detailed cross section view of a modified gasket guard construction of the instant invention.

In the form of the invention disclosed in FIG. 7, the guard-gasket member 40 is formed of solid rubber or the like, and the outer surface 42 of the sealing leg portion 40A of the sealing leg 40 is provided with a plurality of longitudinally extending grooves 43 to define a serrated bottom surface to enhance sealing.

Figure 8:
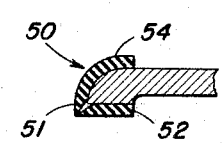
FIGURE 8 is a detail cross sectional view of still another modified gasket-guard construction.
Figure 9:
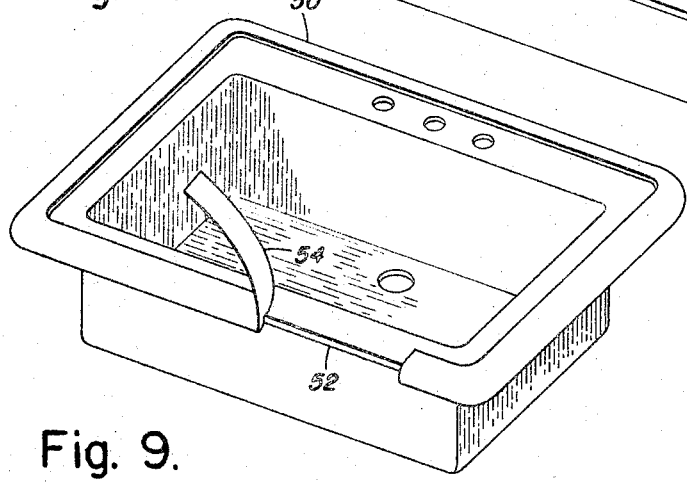
FIGURE 9 is a perspective view of a combined gasket guard construction of FIGURE 8 shown as applied to a fixture and illustrating the removal of the protective leg portion of the gasket-guard member to define a frameless seal in accordance with this invention.

In the form of the invention disclosed in FIGS. 8 and 9, the combined gasket-guard construction 50 is substantially similar to that described with reference to FIGS. 2, 3 and 6 with the exception that a frangible portion 51 in the form of scoring or the like is formed at the juncture between the sealing leg portion 52 and the protective leg portion 54 thereof. The purpose of the frangible portion 51 in this form of the invention is to provide a means whereby the exposed protective leg portion 54 of the member may be readily stripped from the sealing leg portion 52 thereof upon completion of the installation procedure. In this manner the need for cutting the protective leg portion 54 from the leg sealing portion 52 with a cutting tool, as for example a knife or the like, is eliminated.

If desired, the gasket members 24, 40 or 50 may be made in colors to compliment the color of the associated fixture and in this manner be made virtually invisible.

From the foregoing it will be readily noted that combined gasket-guard construction is relatively simple in construction and application, and that it can be readily applied to the peripheral edge portion or lip of a fixture, which is maintained in place during the installation procedures of the fixture to simplify the installation thereof. By removing the protective leg portions of the gasket or guard member, a frameless seal is thus provided that is rendered permanent and free of continuing maintenance.

While the instant invention has been described with reference to several embodiments thereof, and method of installing the same, it will be understood that variations and modifications thereof may be made without departing from the spirit and scope of the instant invention.

What is claimed is:

1. In combination, a sink formed with a circumscribing peripheral edge portion having a downwardly faced surface which is to be placed in sealing relationship with a counter top, a gasket formed of a resilient member of a U-shaped cross section and shaped to snugly embrace the peripheral edge portion of said sink during its shipment, said gasket having a seal forming portion to engage said downwardly faced surface, said seal forming portion being disposed between said downwardly faced surface and a counter top to form a seal therebetween upon installation of said sink in said counter top and said gasket having a protective portion integrally connected to said seal forming portion, said protective portion of said gasket being placed in contact with the exposed finished surface of the sink adjacent the peripheral edge thereto to guard the same against damage in handling during shipment, and means in the form of a score line extending along the juncture of said seal forming portion and said protective portion to effect ready separation of said protective portion from said seal forming portion at the score line so that upon installation of said sink in said counter, said protective portion will be stripped therefrom at the score line to define a frameless seal for said sink.

2. In combination, a receiver which is to be received in a hole formed in a supporting member, said receiver having a peripheral extending lip formed with a flat surface which overlies the marginal edge of said hole to support said receiver therein, an endless gasket circumscribing the lip of said receiver, said gasket being substantially U-shaped in cross-section and sized to snugly embrace said lip to form a protective cover to protect the same in handling and shipping, said gasket having a sealing leg portion which is to be wedged between the flat surface of said lip and the supporting member upon installation of said receiver in said member, an adhesive coating applied to the inner surface of said sealing leg portion to adhesively bond the same to the flat surface of said lip, and said gasket having a protective leg portion to embrace the exposed finished edge of said lip to protect said lip during handling and shipment, and means defined along the junction of said sealing leg portion and protective leg portion to effect ready separation of said protection portion from said sealing leg portion, said latter means comprising a score line formed at said junction to facilitate the removal of said protective leg portion from said sealing portion after the installation of said receiver by tearing away the protective leg portion.

3. The invention as defined in claim 2 and including:
 (a) means to securely clamp said receiver to said supporting member,
 (b) said securing means including a detachable hook and clamp assembly.

4. In combination, a sink or the like adapted to be received in an opening formed in a counter top, said sink having a peripheral extending lip having a flat surface adapted to overlie the marginal edge of said opening to support the sink therein, an endless gasket circumscribing the lip of said sink, said gasket being substantially U-shaped in cross section and sized to snugly embrace said lip to form a protective cover therefor during handling or shipment of the sink, said gasket having a sealing leg portion to be wedged between the flat surface of said lip and a counter top upon installation of said sink in said top, and said gasket having a protective leg portion to embrace the exposed finished edge of said lip and to be removed after installation of said sink, and means defined along the junction of said sealing leg portion and protective leg portion to effect ready removal of said protection portion from said sealing leg portion, said latter means comprising a frangible line formed at said junction to facilitate the removal of said protective leg portion from said sealing portion after installation of said sink by tearing protective leg portion away from the rest of said gasket along said frangible line.

5. A method of shipping from one point and installing at another point a sink in a counter top comprising the steps of:
 (a) placing a gasket about both sides of the peripheral edge of a sink to protect the marginal edge thereof from damage during shipping and handling,
 (b) installing said sink with said gasket in place thereon in a hole adapted to receive the same in a counter top,
 (c) securing the sink in position to said counter top,
 (d) and removing the exposed portion of said gasket at the edge of the sink to define a frameless seal installation for said sink in said counter top.

6. A method of preparing a sink for shipping from one point and installation thereof at another point in a counter top comprising the steps of:
 (a) placing a gasket of U-shaped cross section about the peripheral supporting edge of a sink at the point of manufacture to protect the marginal edges thereof from damage during future shipping and handling thereof,
 (b) installing said sink with gasket in place thereon in an opening which is to receive the same in a counter top,
 (c) securing the sink in position relative to said counter top, whereby said gasket defines a seal therebetween,
 (d) and removing the exposed portion of said gasket at the edge of the sink to define a frameless installation for said sink.

7. The combination of a member having a protective portion and a gasket portion, both portions of said member being arranged in a substantially U-shaped cross section which snugly fits around the peripheral lip of a sink or other fixture which is to be shipped and, upon installation, is to overlie the marginal edge of an opening in a counter top, within which opening said fixture is to be received for installation said member being sized to embrace the lip of said fixture to form a protective cover therefor during handling or shipping, the gasket portion of said member being wedgeable between the lip of said fixture and said counter top upon installation of said fixture, a score line between said protective portion and said gasket portion of said member, thereby facilitating the ready separation of said protective portion from the gasket portion after installation of said fixture.

8. The combination as defined in claim 7, including means to securely clamp said fixture to said counter top, said securing means including a detachable hook and clamp assembly.

9. The combination as defined in claim 7 in which the gasket portion of said member has a serrated surface for engagement with the counter top during installation.

References Cited

UNITED STATES PATENTS

| | | | |
|---|---|---|---|
| 3,028,605 | 4/1962 | Lander | 4—187 |
| 3,034,150 | 5/1962 | Lyon | 4—187 |
| 3,250,040 | 5/1966 | Squires | 49—482 |
| 2,600,599 | 6/1952 | Wycoff | 4—187 |
| 2,993,088 | 7/1961 | Camp | 4—187 |

LAVERNE D. GEIGER, *Primary Examiner.*

H. S. BELL, *Assistant Examiner.*